US011325366B2

(12) United States Patent
Liponkoski

(10) Patent No.: US 11,325,366 B2
(45) Date of Patent: May 10, 2022

(54) METHOD AND APPARATUS FOR ADHESIVE ACTIVATION

(71) Applicant: Lemtapes Oy, Valkeakoski (FI)

(72) Inventor: Sami Liponkoski, Lempäälä (FI)

(73) Assignee: Lemtapes Oy, Valkeakoski (FI)

( * ) Notice: Subject to any disclaimer, the term of this patent is extended or adjusted under 35 U.S.C. 154(b) by 52 days.

(21) Appl. No.: 15/911,363

(22) Filed: Mar. 5, 2018

(65) Prior Publication Data
US 2018/0257360 A1 Sep. 13, 2018

(30) Foreign Application Priority Data

Mar. 7, 2017 (FI) .................................. 20175211

(51) Int. Cl.
| | | |
|---|---|---|
| *B32B 37/12* | (2006.01) | |
| *B27D 1/10* | (2006.01) | |
| *B27D 5/00* | (2006.01) | |
| *B27M 3/00* | (2006.01) | |
| *B27D 1/04* | (2006.01) | |

(52) U.S. Cl.
CPC ............ *B32B 37/1207* (2013.01); *B27D 1/04* (2013.01); *B27D 1/10* (2013.01); *B27D 5/003* (2013.01); *B27M 3/0053* (2013.01); *B32B 2037/1215* (2013.01); *B32B 2037/1253* (2013.01); *B32B 2317/16* (2013.01)

(58) Field of Classification Search
CPC ................................................ B32B 37/1207
See application file for complete search history.

(56) References Cited

U.S. PATENT DOCUMENTS

| | | | | |
|---|---|---|---|---|
| 2,617,456 A | | 11/1952 | Winkel | |
| 3,878,020 A | * | 4/1975 | Huffaker | .................. B27D 1/10 156/291 |
| 4,181,558 A | * | 1/1980 | Neubronner | ............ B65B 51/06 126/285 R |

(Continued)

FOREIGN PATENT DOCUMENTS

| | | |
|---|---|---|
| CN | 101774190 A | 7/2010 |
| CN | 102741025 | 12/2015 |

(Continued)

OTHER PUBLICATIONS

Machine Translation of EP-0199841-A1 (Year: 1986).*

(Continued)

*Primary Examiner* — Daniel McNally
(74) *Attorney, Agent, or Firm* — Thomas | Horstemeyer LLP

(57) ABSTRACT

The invention relates to a method and apparatus for activating an adhesive for composing veneers. A method for activating an adhesive for composing veneers according to an aspect of the invention comprises providing the adhesive on a surface of a veneer, and radiating the adhesive on the surface of the veneer. The method may comprise providing a reinforcing material on the adhesive; or providing an adhesive tape on the surface of the veneer, wherein the adhesive tape comprises adhesive coated or impregnated with a reinforcing material. The method may further comprise radiating the adhesive between the surface of the veneer and the reinforcing material.

15 Claims, 2 Drawing Sheets

(56) References Cited

U.S. PATENT DOCUMENTS

| | | | | |
|---|---|---|---|---|
| 4,608,106 | A | * | 8/1986 | Lahtinen .................. B27D 1/04 156/182 |
| 6,440,254 | B1 | * | 8/2002 | Rich ..................... B29C 66/002 156/272.2 |
| 2003/0026942 | A1 | | 2/2003 | Hejna |
| 2003/0159777 | A1 | * | 8/2003 | Tsujimoto ................ B32B 5/18 156/309.6 |
| 2004/0065982 | A1 | | 4/2004 | Churchland |
| 2007/0102108 | A1 | * | 5/2007 | Zheng ..................... B27D 1/04 156/272.2 |
| 2012/0285604 | A1 | * | 11/2012 | Schmid .................. B27D 5/003 156/64 |

FOREIGN PATENT DOCUMENTS

| | | |
|---|---|---|
| DE | 19737593 C1 | 3/1999 |
| DE | 102009050858 A1 | 4/2011 |
| DE | 102011015195 A1 | 9/2012 |
| DE | 102012223987 A1 | 6/2014 |
| DE | 102016224217 A1 | 6/2018 |
| EP | 0199841 A1 * 11/1986 ............... B27D 1/00 |
| EP | 0298291 A2 | 1/1989 |
| FR | 2414984 A1 | 8/1979 |
| GB | 936135 B | 1/1960 |
| GB | 2012665 A | 8/1979 |
| JP | H10 337995 A | 12/1998 |
| SU | 1004438 A1 | 3/1983 |

OTHER PUBLICATIONS

Translation of Abstract of EP0199841 (Year: 1986).*
Search report of FI 20175211 issued bny Finnish Patent and Registration Office on Oct. 3, 2017.
Search report of EP 18397507.7 issued by European Patent Office dated Jul. 2, 2018.
Office Action dated May 8, 2021 in CN Application No. 201810187862.8.
Notice of Allowance from Russian Patent Office dated Oct. 25, 2021, 15pp.

* cited by examiner

METHOD AND APPARATUS FOR ADHESIVE ACTIVATION

PRIORITY

This application claims priority of Finnish national patent application number FI 20175211 filed on Mar. 7, 2017 and the contents of which is incorporated herein by reference.

TECHNICAL FIELD

The application relates to a method and an apparatus for activating adhesive for attaching veneer sheets.

BACKGROUND

Engineered wood products, such as laminated veneer lumber (LVL) or plywood are made of superposed veneers that have been adhered or laminated together. Veneer sheets have been sliced from wood or tree. Sliced veneer sheets have variations in their quality. In order to effectively utilize wood raw material, a specific process is used for composing veneers. In a veneer composing process, due to different size of usable sliced veneer sheets, the veneer sheets are arranged to be attached next to each other, edge to edge, in order to form veneer having certain surface area, and being usable for manufacturing a plywood. Desired parts of sliced veneer sheets may be utilized for forming a wider area veneer of attached veneer sheets.

Veneer sheets comprise substantially flat and broad surface and thin bonding edge. Bonding edges of adjacent veneer sheets are brought next to each other. An adhesive tape is provided over intersection of the adjacent veneer sheets in order to attach the veneer sheets to each other and to form a continuous veneer of wider surface compared to original veneer sheets.

The adhesive tape may comprise a material coated with adhesive. The adhesive may comprise reactive adhesive, which remains in non-adhesive state, until activated in order to become adhesive. Hot melt adhesive is an example of reactive adhesive, which is melt by heating. The hot melt adhesive is heated, before applied to a veneer surface. The adhesive or the tape may be heated for example using a hot wheel or heated tube, before applying the adhesive tape and/or the molten adhesive onto the veneer surface.

SUMMARY

An object of the application is to provide an effective activation of an adhesive for attaching veneer sheets. Activation of the adhesive is controllable and adaptable to other process parameters.

A method for activating an adhesive for composing veneers according to an aspect of the invention comprises providing the adhesive on a surface of a veneer, and radiating the adhesive on the surface of the veneer. The method may comprise providing a reinforcing material on the adhesive; or providing an adhesive tape on the surface of the veneer, wherein the adhesive tape comprises adhesive coated or impregnated with a reinforcing material. The method may comprise providing the adhesive on a bevelled edge surface of the veneer, and providing a bevelled edge surface of another veneer on the adhesive. The method may further comprise radiating the adhesive between the two substrates, which are to be adhered.

An apparatus for activating an adhesive for composing veneers according to an aspect of the invention comprises, the adhesive provided on a surface of a veneer, and a radiation device arranged to radiate the adhesive on the surface of the veneer. The apparatus may comprise a wheel arranged to guide a reinforcing material on the adhesive provided on the surface of the veneer; or a wheel arranged to guide an adhesive tape on the surface of the veneer, wherein the adhesive tape comprises adhesive coated or impregnated with a reinforcing material. The apparatus may comprise the adhesive provided on a bevelled edge surface of the veneer and a bevelled edge surface of another veneer being provided on the adhesive. The method may further comprise the radiation device arranged to radiate the adhesive between the two substrates, which are to be adhered.

BRIEF DESCRIPTION OF THE DRAWINGS

In the following embodiments are described in more detail with the accompanying figures, where.

DETAILED DESCRIPTION OF THE INVENTION

Figure 1:
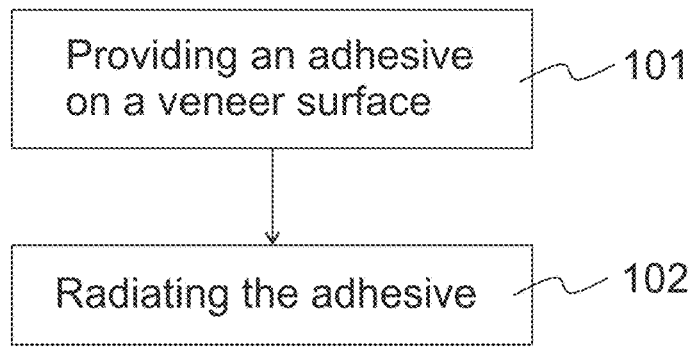
FIG. 1 illustrates a method according to an embodiment.

For manufacturing a plywood veneer sheets may be attached together before the veneer of attached sheets is laminated as the plywood. In a plywood composer machine veneer sheets are placed in a butt join, a side edge next to a side edge, and an adhesive tape is adhered perpendicularly across adjacent butt joint edges of the veneer sheets in order to attach those as a continuous veneer. Alternatively, side edges of the veneers may comprise a bevelled or sloped profile which, when attached via adhesive, form an overlapping, scarf joint between attached veneer sheets.

A veneer sheet is a thin slice of wood, comprising a surface area and a thickness of less than 5 mm, preferably less than 3 mm. Veneer surface is substantially flat, although deviations may occur. The veneer surface comprises irregularities, like crevices, grooves, gaps, holes or depressions. Irregularities may be present at a thickness direction of the veneer. For example, the surface may comprise irregularities in order of 1/10 or 1/100 of the veneer sheet thickness. Alternatively or in addition deviations may relate to a surface shape of a veneer sheet. The surface area may comprise areas deviating from regular plane form. For example, veneer sheets may comprise bent area(s) and/or areas of at least partly wave form.

An adhesive tape may be provided onto veneer surfaces to be adhered. The adhesive tape comprises a material coated or impregnated with adhesive. Alternatively, a material may be provided on an adhesive, for example a line of adhesive, applied onto a surface. In another alternative, adhesive may be applied on a sloped or bevelled edge surface of a veneer and covered by another bevelled edge surface of another veneer. The adhesive is arranged between two counterpart bevelled veneer edge surfaces, which are overlapping in order to form a scarf joint between the veneers.

The material may comprise nylon, paper, fiberglass, polyethylene terephthalate (PET), or any other suitable material. The material may be rolled up on a roll. The material may be in form of a continuous strip or elongated surface comprising width of 1-5 mm, or 1-3 mm, for example. The material may comprise reinforcing material. The material may have a certain tensile strength properties that correspond to strength required for handling the attached veneer sheets. For example, reinforcing material may comprise tensile strength of 100-200 N.

Adhesive may be from natural or synthetic origin. Natural adhesives are made from organic sources, like vegetable starch, natural resins or animal. Natural adhesives may be called bioadhesives. Natural adhesive may comprise gelatin, casein or dextrin. Synthetic adhesives are based on elastomers, thermoplastics, emulsions and thermosets. Examples of thermosetting adhesives are epoxy, polyurethane, cyanoacrylate and acrylic polymers.

Adhesive may be in form of liquid and harden or cure by drying. A liquid adhesive comprises adhesive ingredients, like polymers dissolved in a carrier, which may be solvent or water. Loss of carrier, e.g. evaporation, hardens the adhesive. Examples of drying curable adhesives are rubber cement based adhesives, like styrene-butadiene rubber (SBR), and polyvinyl acetate (PVA) based adhesives.

Hot melt adhesives are in solid form. Hot melt adhesive is melt by heat to a liquid, molten form in order to allow adhesive to be applied and spread. When hot melt adhesive is heated to a molten state, it attains an open time, during which adhesive may be applied. After open time the hot melt adhesive attains a compression time, during which the adhesive and substrate are brought in contact and pressed towards each other. The hot melt adhesive is in a plastic state between the molten- and the solid states. The adhesive is spread across the adhesive area. Initial bond is formed and the adhesive becomes tacky. Temperature of the hot melt adhesive is reduced and an initial bond is formed. The initial bond is strong enough to prevent the adhered substrates and/or the substrate and the adhesive separating from each other. When pressure is released, the adhesive is initially bonded and tacky enough to maintain contact with the substrate. Hot melt adhesive is set or cured in response to loss of heat, i.e. when cooled. Final strong bond is formed. The hot melt adhesive is cooled to a temperature, where the hot melt adhesive is set, final strong bond is formed and adhered parts can be handled. Hot melt adhesives comprise thermoplastics. The hot melt adhesive may comprise ethylene-vinyl acetate (EVA), polypropylene (PP), polyethylene (PE), acrylic, polyamide (PA), thermoplastic polyurethane (TPU), reactive polyurethane (PUR), silicon rubbers, thermoplastic rubber.

Adhesive may be cured via chemical reaction. Multicomponent adhesive comprises two or more chemically reacting components. The chemical reaction causes polymers to crosslink, e.g. into acrylic, urethane or epoxy. The multicomponent adhesive may comprise polyester resin, acrylic polymers and/or polyurethane resin. The components are not inherently adhesive. The components react with each other and adhere to each other when cured. In case of solvent based multicomponent resins solvent is dried during curing the adhesive. Chemically reactive adhesive comprises chemical monomers arranged to change their chemical structure when activated, e.g. radiated. The chemical activation may be implemented by electron beam or ultraviolet radiation. Chemical monomers of the adhesive are polymerized and arranged to crosslink. The adhesive is arranged to form a chemical bond in response to radiation.

One-component adhesive may be cured via chemical reaction provided by an external energy source, such as radiation, heat or moisture. Examples of one-component adhesives comprise cyanoacrylate, epoxy, polyurethane (PU) or reactive polyurethane (PUR).

An adhesive may be cured by light or ultraviolet light. Heat curing adhesives comprise two or more components. When heat is applied the components react and crosslink. The heat curing adhesives may comprise thermoset epoxies, urethanes and polyimides. Moisture curing adhesives cure when those react with moisture present on the substrate surface or in the air. Moisture curing adhesives may comprise cyanoacrylate or urethane.

An adhesive may be starch based, urea based, water based or solvent based. The adhesive may comprise silicate, gelatin, epoxy, acrylate, cyanoacrylate, styrene-butadiene rubber (SBR), polyvinyl acetate (PVA), ethylene vinyl acetate (EVA), resin, phenolic resin, wax, polyurethane (PU), polyamide (PA), polyethylene (PE), polypropylene (PP).

Adhesive is reactive. State of the adhesive may be initiated or speed of change may be effected by radiation. As an example, state of a hot melt adhesive is changed by heating and/or cooling. An adhesive may be in non-adhesive state, until activated. This enables providing adhesive from a roll of adhesive tape, which in non-active state has limited tackiness or does not stick to itself. After activation the reactive adhesive becomes adhesive, i.e. reaches a bonding state. The adhesive may comprise heat reactive adhesive, which achieves an adhesive state in response to application of heat. A hot melt adhesive is melt by heat in order to become molten. When heated, the hot melt adhesive is arranged to exceed its softening point and become adhesive. The hot melt adhesives are heated in order to enable applying and spreading the adhesive in a molten state. The molten hot melt adhesive is applied and spread, e.g. compressed, before the hot melt adhesive is cooled in order to solidify. Adhesive bond between the hot melt adhesive and a substrate is formed during solidification of the hot melt adhesive. An adhesive may be heated, cured or hardened by radiation. Multicomponent adhesives may achieve an adhesive state by two or more mixed components which react chemically. Multicomponent adhesive may comprise crosslinking polymers. Multicomponent adhesives may be tacky in their primary form and form a final adhesive bond strength when radiated. Adhesive bond formed by evaporation of a carrier may be accelerated by providing heat radiation.

FIG. 1 illustrates a method according to an embodiment. Method comprises providing an adhesive onto a surface of a veneer 101. A material, e.g. a reinforcing material, may be applied onto the adhesive on a surface of a veneer. Thus the adhesive and the material may be provided successively and separately on the surface of the veneer. Alternatively an adhesive tape comprising a material coated or impregnated with adhesive may be provided onto the surface of the veneer. This enables providing the adhesive and the material in a single phase on the veneer surface. In an alternative method, the adhesive is applied on a bevelled edge surface of a veneer. A corresponding bevelled edge surface of another veneer is provided onto the applied adhesive, opposing the bevelled edge surface of the veneer onto which the adhesive has been applied. The applied adhesive may be in non-adhesive state.

The method of FIG. 1 comprises radiating the adhesive 102. The adhesive is arranged between two substrates to be adhered. The substrates may comprise the veneer surface and the (reinforcing) material, or two bevelled veneer surfaces. Radiating the adhesive 102 may comprise radiating the adhesive between the substrates to be adhered. A pressure may be provided towards an adhesive in a liquid form before radiating the adhesive 102. Radiating by heat may accelerate curing the adhesive in order to form final adhesive bond. Radiating by heat may melt a heat melt adhesive to a molten state. After heated to a molten state, the heat melt adhesive may be pressed in order to spread the adhesive to an adhesive area of the substrates. After pressed, the heat melt adhesive is cured by cooling. The radiation 102 may comprise radiating by heat or ultraviolet radiation in order to initiate chemical reaction. The adhesive bond may be provided by chemically crosslinking components of adhesive in response to radiation.

The method may comprise pressing the adhesive towards the substrates, when the adhesive is in liquid or molten state. This may be done before or after radiation 102. In case of reactive adhesive in a solid form, which is cured by radiation, e.g. by causing a chemical reaction, no pressing phase is applied. Pressing spreads the adhesive more evenly between the substrates and presses the substrates flat against and along each other. When reinforcing material is used, adhesive area corresponds to the surface area of the reinforcing material. In case of two bevelled surfaces of veneers against each other, the adhesive area corresponds to the bevelled surfaces. The adhesive may be cured or hardened during or after the pressing.

Figure 2:
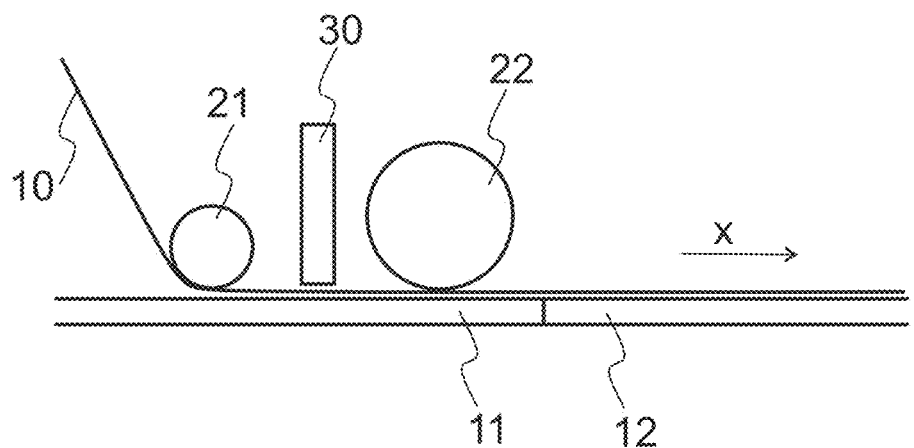
FIG. 2 illustrates an apparatus according to an embodiment.

FIG. 2 illustrates an apparatus according to an embodiment. Adhesive is provided to a surface of a veneer 11, 12. The adhesive may be applied straight on the surface of the veneer 11, 12. The adhesive may be arranged to flow as a line of adhesive on the surface of the veneer 11, 12. A reinforcing material 10 may be applied on the adhesive applied on the surface of the veneer 11, 12. Alternatively, the adhesive may be coated on surface of the material 10 or impregnated with the material 10. The adhesive may be provided as an adhesive tape 10 on the surface of the veneer 11, 12. The adhesive with or without the material may be unrolled from a roll.

The material, with or without the adhesive, is guided to a surface of veneers 11, 12. A wheel 21 may be arranged to guide the adhesive tape 10 and/or the material to the surface of veneers 11, 12. A wheel may be called a roll or a reel. The veneers 11, 12 are arranged such that their edges are arranged next to each other in order to form a butt joint. The veneers 11, 12 are arranged to move to a machine direction as illustrated with an arrow x. A radiation device 30 is arranged to the machine direction x after the wheel 21. Adhesive is radiated after the adhesive is applied on the surface of a veneer and/or after the adhesive is arranged between the veneer and the material. For example a hot melt adhesive may be guided to a veneer surface by a wheel 21 and placed between two substrates, which are to be adhered. The radiation device 30 is arranged to melt the hot melt adhesive by heat radiation. The hot melt adhesive achieves a molten state after heated by the radiation device 30. A pressure wheel 22 is arranged to the machine direction x next to the radiation device 30. After the hot melt adhesive is brought to a molten state at the radiation device 30, the pressure wheel 22 applies pressure on the molten adhesive. The pressure applied on the adhesive is arranged to press a material 10 against a veneer(s) surface 11, 12 opposing the material 10 and to spread adhesive along the material surface. The pressure wheel 22 may comprise a cooling mechanism. The pressure wheel 22 is cooled in order to participate cooling the adhesive. Alternatively or in addition, a cooling device may be provided after the pressure wheel 22 in a machine direction x. The cooling cures the hot melt adhesive and an adhesive bond is formed. Cooling down the adhesive enables forming a strong solid adhesive bond quickly after the melting of the adhesive.

When adhesive in molten or liquid state may be applied on a veneer surface 11, 12, the wheel 21, which is arranged before the radiation device 30 in the machine direction x, may act as a pressure wheel. The wheel 21 provides pressure on adhesive between the substrates to be adhered. After the flowing adhesive is pressed and spread to an adhesive area by the wheel 21, the radiation device 30 radiates the adhesive area in order to activate the adhesive. The radiation device 30 may radiate heat, UV radiation, IR radiation, (visible) light, or other suitable radiation in order to activate the adhesive. Adhesive in a liquid form is cured by radiation of the radiation device 30. For example, heat radiation may accelerate evaporation of water or solvent of the adhesive.

When a solid adhesive 10 is applied, the wheel 21, arranged before the radiation device 30 in a machined direction x, may be left out or it may guide material 10 with or without the adhesive to the surface of the veneer 11, 12. The radiation device 30 provides radiation for activating the adhesive. The activated adhesive forms adhesive bonds, for example by crosslinking. Heat may be formed during curing the adhesive at the radiation device 30. After the radiation device 30, in a machine direction x, a wheel 22 may be a cooling wheel 22. Alternatively the wheel 22 may be left out.

Figure 3:
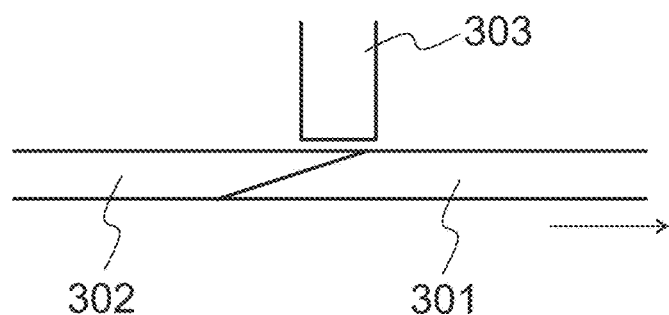
FIG. 3 illustrates an adhesive joint according to an embodiment.

FIG. 3 illustrates an adhesive joint according to an embodiment. The adhesive is applied on a bevelled veneer surface 301. The bevelled edge surfaces 301, 302 of the veneers are attached to each other via adhesive. The radiation device 303 activates or cures the adhesive. A cooling unit, for example a cooling wheel, may be provided after the radiation device 303 in the machine direction x. As in FIG. 1, a pressure wheel may be provided before and/or after the radiation device 303 in the machine direction x.

An radiation device is arranged to activate, e.g. melt, make tacky or cure, harden or set, adhesive between the substrates to be adhered to each other. The substrates to be adhered to each other may comprise two bevelled edge veneer surfaces, or a veneer plane surface and a material, which may be a reinforcing material. Two adjacent veneers, arranged next to each other, side edge against a side edge, are arranged to butt joined via the adhesive. The adhesive is arranged to cross the butt joint of the adjacent veneer surfaces. The radiation device is arranged to radiate the adhesive. The radiation device may comprise a laser, an electron beam, an ultraviolet radiator, an infrared radiator or an ultrasound radiator.

Laser technology is based on optically amplified light based on stimulated emission of electromagnetic radiation. Laser may be used for providing continuous or pulsed beam of light. Laser may provide energy and raise temperature of a tape surface. Laser is controllable precisely, both dimensionally and directionally. Laser provides effective and controllable heating for a specific area. Spatial coherence of laser allows focusing to a determined area. Laser has high temporal coherence, which allows selecting wavelength for the laser. The selected wavelength may comprise narrow spectrum, for example a single colour. Wavelength may be selected such that it has effect on the adhesive, and has no effect on the adhered substrates next to the adhesive. Laser enables precise control of impact area, as well as power and temperature provided on the impact area. Used wavelength may be selected according to application. Radiation source of laser may be selected as desired. Laser may be based on visible, ultraviolet, infrared or other electromagnetic radiation of any frequency. Laser is applicable technique for heating and melting hot melt adhesives. UV-laser may be used for activating or curing UV curable adhesives, which include an UV catalyst.

In electron beam technology free electrons in a vacuum are manipulated by electric and magnetic fields in order to form a fine beam. When the electron beam is arranged to collide with a solid tape substrate, electrons are converted into heat or kinetic energy. Electron beam technology enables concentration of energy in a small area. Amount and impact area may be controlled precisely. Electron beam may provide rapid increase of temperature at the determined location of impact. Electron beam is applicable for radiating and activating crosslinking of monomers. No other crosslinking components are required. One component adhesive is suitable, and no two component adhesive or additional complex catalysts are required for electron beam radiation activation. The activation may be very rapid. Electron beam activation may be used for reactive polyurethane (PUR).

Crosslinked joint may be permanent and irreversible. The crosslinked joint cannot be returned to its initial state. On the contrary, for example hot melt adhesive may be melt in order to become tacky and cooled to cure multiple times. Thus hot melt adhesive joint is reversible.

Infrared, IR, technology utilizes electromagnetic radiation with longer wavelengths compared to those of visible light, from 700 nm up to 1 mm. Infrared may heat the tape instead of surrounding air. Infrared heater may replace contact heating of heated wheel, as well as convection via heated air.

This may provide effectivity to heating. Further efficiency may be provided by matching used wavelength of the infrared heater to the absorption characteristics of the tape substrate. Infrared technology may employ diodes, like light emitting diodes.

Ultraviolet, UV, radiation comprises electromagnetic radiation of wavelengths from 10 nm to 400 nm. Long wavelength ultraviolet radiation may be used for causing chemical reactions. Laser may emit ultraviolet light. Laser may be used to activate UV-curable adhesives. Certain amount of radiation may cure the adhesive or initiate the activation/curing process of the adhesive.

Ultrasound technology utilizes sound waves of frequencies from 20 kHz up to several gigahertz. For example ultra sound frequency with low amplitude vibration may be used for producing heat. Used frequency may comprise 15-40 kHz. Energy is transferred to a desired area via ultrasound waves. Created mechanical vibration may cause rapid heating of the impact surface. Ultrasound heating is applicable to e.g. adhesives comprising thermoplastics. Used adhesive may comprise polyethylene. Thermoplastic components may be attached to a surface of a veneer via ultrasound welded joint. Thermoplastic may be part of adhesive. Alternatively thermoplastic may be a single oriented film arranged on the surface, which is to be adhered. Alternatively thermoplastic may be coextruded film. Thermoplastic may comprise polypropylene or polyethylene.

Veneer composing process is continuously interrupted and it proceeds via periodic impulses. When the veneers move to a machine direction, the adjacent veneers are united via adhesive. Accordingly, radiation is applied when the veneers move. Certain output power is required to a certain area at certain time. Then again, during interruption, when veneers do not move, no radiation is applied, no power is consumed. Due to interrupted composing process it is effective to provide corresponding radiation (energy) at corresponding pulses. Continuous energy consumption or loss of energy may be avoided by provided fast adaptable radiation. No cooling time may be required for the radiation device. This has effect on energy consumption and to maintenance of the devices, units and apparatus.

Concentration of energy to a desired activation area may be provided. Source energy may be high. Adhesive radiation, e.g. transformation of radiated energy to heat energy, may be quick. This enables fast radiation effect, or substantially small amount of time used for heating or activation compared to heating an adhesive tape via a heated roll or heated tube, for example. The provided energy may be focused to a certain area. Optics, directing mirrors or other suitable means may be used for focusing energy to a certain area. For example in case of a laser, concentrated light energy may be directed to a desired area, which may correspond to width of the (reinforcing) material at a certain length of the material. Heating of surrounding air or other means may be avoided. Energy from radiation requires no physical contact with the impact surface, which is receiving the radiation.

Figure 4:
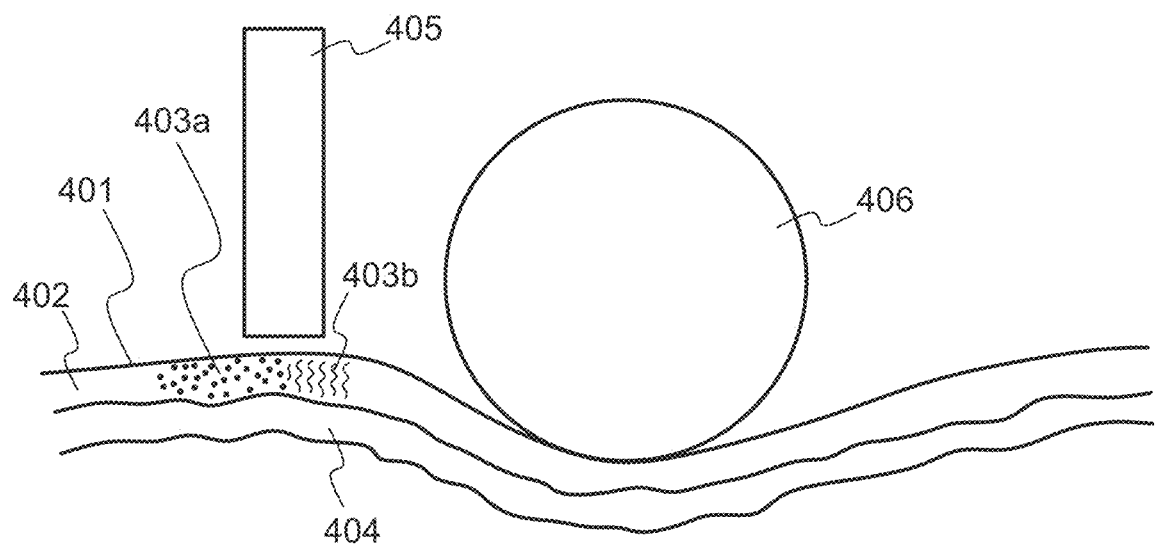
FIG. 4 illustrates an adhesive tape on a veneer surface according to an embodiment.

FIG. 4 illustrates a tape on a veneer surface according to an embodiment. An adhesive tape 401 comprises a substrate material 402 impregnated with reactive adhesive 403a. An radiation device 405 is arranged to radiate the reactive adhesive 403a next to the veneer 404 surface. The adhesive 403a may be a hot melt adhesive, which is heated above its softening point temperature by the radiation device 405. After the radiation, the adhesive 403b is melted or in fluid form, as illustrated in the FIG. 4. This enables adhesive 403b flowing to the veneer 404 sheet along sheet surface profile. In case of small deviations of the profile, the adhesive 403b in a flowing, liquid form reaches the veneer 404 surface area facing the adhesive tape 401. The flowing adhesive reaches also small deviations of the veneer surface, like gaps or grooves. This enables forming secure and continuous bond along the adhesive tape 401 area. Further, any possible extra flow of adhesive is arranged to stay between the veneer 404 sheet and the adhesive tape 401 instead of dropping or flowing to surrounding and thereby spreading on the surrounding environment, to undesired places, and/or lacking from the formed adhesive joint. In case, where an adhesive tape is heated before it is brought on a veneer surface, the delay between heating and pressing may cause unattached portions between the tape substrate and the veneer. In the FIG. 4 pressure is applied right after the adhesive has been radiated. The radiation device 405 and the pressure unit 406 are arranged sequentially, without anything in between. This enables minimizing the distance between the radiation device 405 and the pressure unit 406. Thereby adjustment and control of adhesive radiation due to the distance and its effects is minimized or avoided. Pressure unit 406 is arranged to press the adhesive tape 401 against the veneer 404. Due to pressure the adhesive tape 401 follows surface shape of the veneer 404. Thus, the adhesive tape 401 is attached to the surface 404, even if the surface has uneven shape. The pressure unit 406 may comprise a cooling unit or -mechanism. This allows controlled cooling of the adhesive 403b. This may accelerate curing of the adhesive and/or allow forming a strong solid bond quickly after activation/melting of the adhesive. Further, cooling may enable handling the adhered veneer due to lack to hot areas and/or due to strong bond.

After the adhesive is heated, pressure is applied via a pressure unit. The pressure unit may comprise a pressure wheel, a roll, a reel, a nip or a plate, for example. A pressure unit is shown in FIG. 1. Alternatively, wheels may be arranged against each other in order to form a nip. The nip or the plate may be used for pressing the surfaces next to the adhesive against each other. The nip or the plate may be used to press the adhesive tape against the veneer surface. Pressure may be provided from upwards, by a pressure unit, against veneer surfaces or against a support of the veneer surfaces. Alternatively or in addition pressure may be provided from downwards, towards a pressure unit, via the veneer surfaces or the support. The adhesive is arranged to be pressed on the veneer surface. In response to pressure, the adhesive is arranged to penetrate to microscopic, wood grain deviations of the veneer surface and to follow macroscopic, wave-like form of the veneer surface.

After the adhesive has been radiated and pressed evenly and tightly between the tape substrate and the corresponding veneer surface, a cooling unit may be provided. The cooling may enable returning (hot melt) adhesive to an inactive state, or accelerate cooling down heated adhesive or heat formed during the process. The adhesive may be solidified. A cooling unit may comprise a cooling wheel. The cooling unit may be employed after a pressure unit in a direction of movement of the veneers. The cooling unit may be integral part of a pressing wheel.

After radiation and possible pressure is provided, the adhesive may cool down itself. This is workable for some solutions. However, cooling may accelerate curing of adhesive. If cooling is slow, adhesive bond remains weak and material may be separated from veneer surface. Cooling cures the melted hot melt adhesive and enables forming a solid adhesive bond. Adhesive may be heated in order to heat, melt or cure the adhesive. Heat may be formed during radiation and/or pressing. Cooling the adhesive may enable forming strong adhesive bond and handling the adhered product safely, without burns. A pressure wheel comprising a cooling unit enables spreading the adhesive along active area and to the small deviations of the surface due to pressing. At the same time the adhesive is set or curing is accelerated due to cooling. A hot melt adhesive is cooled in order to cure the adhesive and form a strong bond. PUR is crosslinked with moisture and the process is initiated by heat. In some cases, activation of adhesive is initiated by the radiation device and the reaction continues after initiated. In this case e.g. pressure wheel may be applied in a machine direction after the radiation device. In some cases adhesive is activated during radiation. Heat may be formed, so a wheel arranged after the radiation device in the machine direction may be used for cooling the adhesive. This may speed up time between radiation of adhesive and handling the adhered substrates.

In a known solution a heated tube or a heated wheel is used for heating the adhesive of the tape before the tape is guided next to a veneer surface and pressed. Such solutions are dependent on heater, especially length of the tube or radius of the wheel, speed of the tape in the tube or of the wheel and time for heating, i.e. heated tube passing time or time of contact with the wheel of the tape. In addition the tape exiting the heater, being activated i.e. adhesive in a molten or flowing state, is turned and guided to the surface of a veneer. This phase may cause adhesive to drop at the heated tube or nearby the tube or the wheel. This in turn poses additional needs for maintenance. Compared to the known solution, the radiation device of embodiments avoids run or overlap or drops of adhesive at undesired places or phases, between radiation of adhesive and pressing or cooling it. No turning of tape occurs after radiation of the adhesive.

A delay or distance between an radiation device and pressure device is to be taken into account. In known solutions heated tape is directed to a veneer surface via air. Due to time after a heater and movement of the heated adhesive tape the adhesive is cooled. The cooling is taken into account in heating phase such that the adhesive tape is overheated at the heater in order to have desired flowing properties at the veneer surface and during pressing. Overheating may cause excessive flow of adhesive. In addition, if overheated adhesive is used for attaching tape to a veneer surface, substrate and adhesive of the tape tend to disintegrate from each other. The radiation device of embodiments enables effective radiation, heating and/or curing and use of energy. The heating is controllable such that the adhesive exceeds its softening point and becomes adhesive. Controlling is precise in view of heated area and temperature of it. While the adhesive tape moves with the veneers on the veneer surface, an air contact of adhesive is avoided. Thus uncontrolled cooling is minimized. Also distance between radiation device and pressing is minimized. There are no turning or guiding phases between those two. This enables controlling the temperature of the adhesive at the radiation device and at the pressing phase.

Figure 5A:
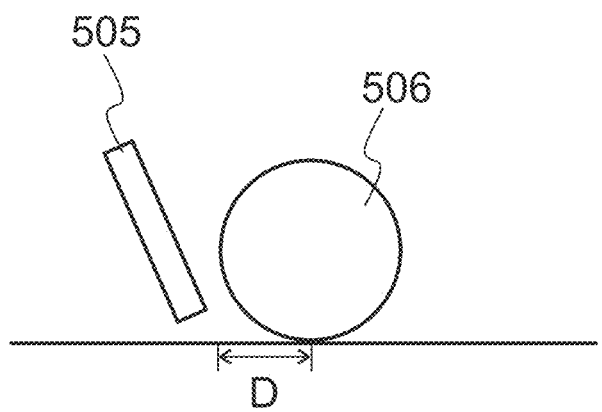
FIG. 5a illustrates a radiation device according to an embodiment.

FIG. 5a illustrates a radiation device according to an embodiment. For example a hot melt adhesive may be melt by an radiation device 505. The radiation device 505 is arranged next to a wheel 506 for pressing and/or cooling. The molten hot melt adhesive is arranged to be pressed and cooled by the wheel 506 right after heated by the radiation device 505. The distance D between the radiation device 505 and the pressure and/or cooling unit 506 is reduced. This has effect on enabling pressing the adhesive in its molten state. Further, no additional heating or overheating of adhesive is needed, since the achieved molten, tacky adhesive is pressed right after heated. Unrolling adhesive tape from a roll and/or composer machine and/or composing process may pose stress to the adhesive and/or separate it from substrate(s). Thus short tacky time and fast curing may effect on providing strong bond.

Figure 5B:
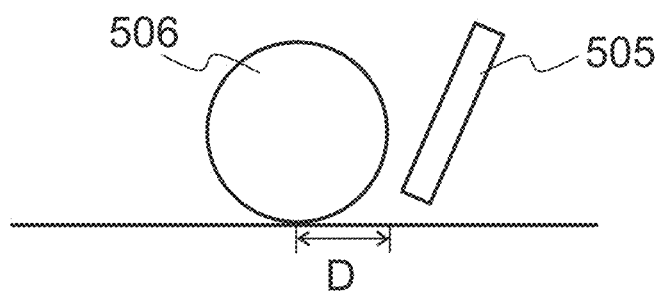
FIG. 5b illustrates a radiation device according to an embodiment.

FIG. 5b illustrates a radiation device according to an embodiment. A pressure unit 506 is arranged before a radiation device 505. This may apply to an adhesive in a liquid form, which may be pressed in order to spread to the surface before activated. The radiation device 505 may initiate activation, which may be arrange to continue. The radiation device 505 may cure the adhesive, e.g. by heat. A cooling unit may be arranged after the radiation device. The pressure unit 506 is arranged right next to the radiation device 505. Distance between the pressure unit 506 and the radiation device 505 is reduced. Radiation right after pressing has effect of maintaining the contact of substrates via adhesive, as pressed, and/or avoiding separation of pressed substrates, material and/or adhesive from the veneer surface. Pressure enables spreading the adhesive to the correct places on the veneer surface. Radiation and curing right after that enables forming desired strong adhesive bond with minimum if any interruptions.

In FIGS. 5a and 5b, distance D between a pressure unit 506 and a radiation device 505 is reduced. In addition to bringing the pressure unit 506 and the radiation device next to each other, distance D between them is reduced. This is enabled by the radiation device being a radiator. The radiator enables directing and focusing the radiation to a desired impact area. The pressure unit 506 wheel diameter does not pose limitation, as it does for previously used tube or wheel formed heaters/activators. The radiation device 505 enables providing the impact area very close to the nip or pressure impact area. The radiation device 505 may be directed such that it radiates towards the nip or pressure impact area. Distance D between the radiation device impact area and the pressure unit impact area may be less than radius of the pressure wheel. Distance D may be in order or millimetres. For example, distance D may be 5-500 mm, preferably 5-250 mm, more preferably 5-50 mm.

Heating tape via radiation is controllable precisely, dimensionally and directionally. This enables effective heating directed to the adhesive, instead of heating adhesive via other parts via conduction or convection. Control of heating in view of amount and adjustment has effect on maintaining desired temperature of adhesive at the following pressing phase. This enables providing adhesive in an adhesive state to the pressing phase. This has effect on the adhered substrates and adhesive, enabling maintaining their integral construction instead of separating from each other due to too high temperature. For example tape material is not separated from the veneer surface or the adhesive. This enables forming strong bond. Bond strength is dependent on adhesive spreading over an adhesive tape surface area. Further this enables attachment of the tape to possible deviation portions the veneer, which differ from even, flat surface dimensions or shape.

The adhesive may be in solid form, inactive state, when applied on a surface of a veneer. The adhesive may be in adhesive state a short time. Length between a radiation device and the pressure unit is shortened. Additional phases, like turning, between the radiation device and pressure unit are avoided. The pressure is applied to the molten adhesive soon after radiated. This ensures that the adhesive is in tacky, molten state, when pressure is applied. This in turn ensures spreading of adhesive along tape area between the tape surface and the veneer surface. This enables providing bond strength, which is proportional to the area of the tape and area of adhesive over the tape surface.

A radiation device is arranged to activate, e.g. heat or cure, the adhesive tape, which is arranged next to a veneer surface. This has effect of avoiding excessive flow of adhesive, before applied on a veneer surface. Further this has effect of avoiding droplets of adhesive at undesired places or phases. Adhesive is radiated to become liquid and tacky between a tape substrate and veneer surface. Therefore droplets of adhesive nearby radiation device is avoided.

A radiation device enables radiating effectively a certain tape area. Controllable radiation device enables adapting to other process parameters. For example, if a process is stopped, heating or radiation may be stopped as well. Delays of process or changes of speed are adaptable via radiation device control and fast response. Proper radiation enables effective use of energy. Further adhesive state is achieved shortly, without delays, due to short activation time.

An aspect of the invention comprises a method for activating an adhesive for composing veneers comprising providing the adhesive on a surface of a veneer, and radiating the adhesive on the surface of the veneer. The method may comprise providing a reinforcing material on the adhesive; or providing an adhesive tape on the surface of the veneer, wherein the adhesive tape comprises adhesive coated or impregnated with a reinforcing material. The method may comprise radiating the adhesive between the surface of the veneer and the reinforcing material. The method may comprise providing the adhesive onto surfaces of two adjacent veneers perpendicular across butt joint edges of the two adjacent veneers. The method may comprise providing the adhesive on a bevelled edge surface of the veneer, and providing a bevelled edge surface of another veneer on the adhesive.

The method may comprise radiating the adhesive via one of laser, infrared, ultraviolet, ultrasound, electron beam. The method may comprise radiating the adhesive in order to heat or cure the adhesive. The method may comprise radiating the adhesive is arranged to melt a hot melt adhesive, further comprising pressing and cooling the hot melt adhesive after melt. The method may comprise radiating the adhesive is arranged to cause crosslinking of the adhesive. The method may comprise radiating the adhesive is arranged to heat the adhesive in order to dry the adhesive.

The method may comprise pressing the adhesive towards the surface of the veneer before and/or after the radiating. The method may comprise distance between the radiating and the pressing being 5-500 mm, preferably 5-250 mm, more preferably 5-50 mm. The method may comprise cooling the radiated adhesive during or after the pressing.

An aspect of the invention comprises an apparatus for activating an adhesive for composing veneers, comprising the adhesive provided on a surface of a veneer, and a radiation device arranged to radiate the adhesive on the surface of the veneer.

The apparatus may comprise a wheel arranged to guide a reinforcing material on the adhesive provided on the surface of the veneer; or a wheel arranged to guide an adhesive tape on the surface of the veneer, wherein the adhesive tape comprises adhesive coated or impregnated with a reinforcing material. The apparatus may comprise adhesive being provided on a bevelled edge surface of the veneer and a bevelled edge surface of another veneer being provided on the adhesive.

The apparatus may comprise the radiation device including an energy source based on a laser, an electron beam, an infrared, an ultraviolet or an ultrasound. The apparatus may comprise the radiation device is arranged to heat, dry or cure the adhesive. The apparatus may comprise the radiation device is arranged to melt a hot melt adhesive, further comprising a pressure unit arranged to spread the molten hot melt adhesive and a cooling unit arranged to cure the hot melt adhesive; wherein optionally the pressure unit and the cooling unit may be integrated as a single unit.

The apparatus may comprise a pressing unit arranged to press the adhesive towards the surface of the veneer before and/or after the radiation device. The apparatus may comprise a distance between the pressing unit impact area on the surface of the veneer and the radiation device impact area on the surface of the veneer comprising 5-500 mm, preferably 5-250 mm, more preferably 5-50 mm. The apparatus may comprise a cooling unit arranged after the radiation device, wherein the cooling unit may be integral with the pressing unit or arranged after the pressing unit.

What is claimed is:

1. A method for activating an adhesive for composing veneers, said method comprising steps of:
    applying an adhesive tape comprising a reinforcing material coated or impregnated with a hot melt adhesive, wherein the reinforcing material and hot melt adhesive are present in a single phase, to a surface of a veneer, said hot melt adhesive being located between the surface of the veneer and the reinforcing material; and
    radiating the hot melt adhesive through the reinforcing material on the surface of the veneer by a radiation device including an energy source based on a laser,
    wherein the reinforcing material having an elongated surface and a width ranging from 1-5 mm in the form of a strip is adhered perpendicularly across adjacent butt joint edges of veneer sheets, so as to attach the veneer sheets as a continuous veneer and wherein the veneer sheets are composed so as to form a wider area veneer, and wherein adhesive area corresponds to reinforcing material surface area.

2. The method for activating an adhesive for composing veneers according to claim 1, wherein
the adhesive tape coated or impregnated with the hot melt adhesive is applied onto surfaces of two adjacent veneers perpendicular across butt joint edges of the two adjacent veneers.

3. The method for activating adhesive for composing veneers according to claim 1, further comprising radiating the hot melt adhesive to heat the hot melt adhesive.

4. The method for activating adhesive for composing veneers according to claim 1, further comprising:
radiating the hot melt adhesive arranged to melt a hot melt adhesive;
pressing the hot melt adhesive towards the surface of the veneer after the radiating; and
cooling the radiated hot melt adhesive during or after the pressing.

5. The method for activating adhesive for composing veneers according to claim 1, further comprising radiating the hot melt adhesive arranged to cause crosslinking of the hot melt adhesive.

6. The method for activating adhesive for composing veneers according to claim 1, further comprising:
radiating the hot melt adhesive that is arranged to heat the hot melt adhesive so as to dry the hot melt adhesive.

7. The method according to claim 1, wherein radiation radiated by the radiation device comprises a wavelength selected, such that the wavelength has an effect on the hot melt adhesive and the wavelength has no effect on adhered substrates next to the hot melt adhesive.

8. An apparatus for activating an adhesive for composing veneers, comprising:
an adhesive tape comprising a reinforcing material coated or impregnated with a hot melt adhesive, wherein the reinforcing material and hot melt adhesive are present in a single phase applied to a surface of a veneer, said hot melt adhesive being located between the surface of the veneer and the reinforcing material; and
a radiation device arranged to radiate the hot melt adhesive through the reinforcing material on the surface of the veneer,
wherein the radiation device comprises an energy source based on a laser,
wherein the reinforcing material having an elongated surface and a width ranging from 1-5 mm in the form of a strip is adhered perpendicularly across adjacent butt joint edges of veneer sheets, so as to attach the veneer sheets as a continuous veneer and wherein the veneer sheets are composed so as to form a wider area veneer, and
wherein adhesive area corresponds to reinforcing material surface area.

9. The apparatus for activating an adhesive for composing veneers according to claim 8, wherein the radiation device is arranged to melt the hot melt adhesive, said apparatus further comprising a pressure unit arranged to spread the molten hot melt adhesive and a cooling unit arranged to cure the hot melt adhesive.

10. The apparatus for activating an adhesive for composing veneers according to claim 9, wherein the pressure unit and the cooling unit are integrated as a single unit.

11. The apparatus for activating an adhesive for composing veneers according to claim 8, further comprising:
a wheel arranged to guide the adhesive tape comprising the reinforcing material coated or impregnated with the hot melt adhesive applied to the surface of the veneer.

12. The apparatus for activating an adhesive for composing veneers according to claim 8, further comprising a pressing unit arranged to press the adhesive against the surface of the veneer after the radiation device.

13. The apparatus for activating an adhesive for composing veneers according to claim 12, further comprising a cooling unit arranged after the radiation device, wherein the cooling unit is integral with the pressing unit or arranged after the pressing unit.

14. The apparatus for activating an adhesive for composing veneers according to claim 8, wherein a distance between a pressing unit impact area on the surface of the veneer and a radiation device impact area on the surface of the veneer comprises 5-500 mm, 5-250 mm or 5-50 mm.

15. The apparatus according to claim 8, wherein radiation comprises a wavelength, which is selected, such that it has effect on the hot melt adhesive and it has no effect on adhered substrates next to the hot melt adhesive.

* * * * *